United States Patent [19]

Tamura et al.

[11] Patent Number: 4,704,530
[45] Date of Patent: Nov. 3, 1987

[54] RADIATION IMAGE READ-OUT APPARATUS

[75] Inventors: Kaoru Tamura; Yasuhiro Kawai, both of Kanagawa, Japan

[73] Assignee: Fuji Photo Film Co., Ltd., Japan

[21] Appl. No.: 788,450

[22] Filed: Oct. 17, 1985

[30] Foreign Application Priority Data

Oct. 20, 1984 [JP] Japan .................................. 59-220739

[51] Int. Cl.$^4$ .............................................. G01T 1/105
[52] U.S. Cl. .............................. 250/327.2; 250/484.1; 271/186; 271/225; 271/902
[58] Field of Search .................. 250/327.2, 337, 484.1; 378/172, 173, 174, 181; 271/225, DIG. 902, 291, 186

[56] References Cited

U.S. PATENT DOCUMENTS

| | | | |
|---|---|---|---|
| 3,885,664 | 5/1975 | Fujimura | 198/572 |
| 3,948,505 | 4/1976 | Miller et al. | 271/303 |
| 4,214,740 | 7/1980 | Acquaviva | 271/3 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,527,060 | 7/1985 | Suzuki et al. | 250/327.2 |
| 4,603,253 | 7/1986 | Nakagawa | 250/327.2 |

FOREIGN PATENT DOCUMENTS 11395  2/1981  Japan .................................. 250/327.2

Primary Examiner—Janice A. Howell
Assistant Examiner—Constantine Hannaher
Attorney, Agent, or Firm—Gerald J. Ferguson, Jr.; Michael P. Hoffman; Michael J. Foycik, Jr.

[57] ABSTRACT

A radiation image read-out apparatus comprises a section for reading out a radiation image stored in a stimulable phosphor sheet, a section for erasing the radiation energy remaining on the stimulable phosphor sheet after image read-out, and a section for stacking the stimulable phosphor sheets after erasing. The erasing section and the stacking section are positioned above the read-out section. A read-out sheet conveyance system is positioned between the read-out section and the erasing section for conveying the stimulable phosphor sheet so that the surface of the stimulable phosphor sheet facing up at the read-out section faces up also at the erasing section. An erased sheet conveyance system is positioned between the erasing section and the stacking section for conveying the stimulable phosphor sheet so that the surface of the stimulable phosphor sheet facing up at the erasing section faces down at the stacking section.

5 Claims, 3 Drawing Figures

RADIATION IMAGE READ-OUT APPARATUS

BACKGROUND OF THE INVENTION

1. Field of the Invention

This invention relates to a radiation image read-out apparatus comprising a read-out section, an erasing section and a stacking section combined integrally with each other for use in a radiation image recording and reproducing system.

2. Description of the Prior Art

When certain kinds of phosphors are exposed to a radiation such as X-rays, α-rays, β-rays. γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

In the aforesaid radiation image recording and reproducing system, the stimulable phosphor sheet is used to temporarily store a radiation image until it is read out by scanning with stimulating rays. Therefore, after the read-out of the radiation image is finished, the radiation energy remaining on the stimulable phosphor sheet should preferably be erased for reusing the stimulable phosphor sheet for image recording.

FIG. 3 is a schematic side view showing the conventional radiation image read-out apparatus proposed to satisfy the aforesaid need.

The radiation image read-out apparatus of FIG. 3 is provided with a read-out section 2 for reading out a radiation image stored in a stimulable phosphor sheet 1, an erasing section 3 for erasing the radiation energy remaining on the sheet 1 after image read-out, a stacking section 4 for stacking the sheets 1 after erasing, and a control unit 5 for controlling the operations of the read-out section 2, erasing section 3, stacking section 4 and the sheet conveyance system linking these sections.

The control unit 5 is positioned above the read-out section 2, and the erasing section 3 and the stacking section 4 are positioned at the side of the read-out section 2. The stimulable phosphor sheet 1 is conveyed to the read-out section 2 in the direction as indicated by the arrow A, and the radiation image stored in the sheet 1 is read out while it is conveyed by a conveyance means 6 constituted by rollers and belt conveyors in the direction as indicated by the arrow A1. After the image read-out is finished, the sheet 1 is further conveyed in the direction as indicated by the arrow A2 to the erasing section 3 where the sheet 1 is exposed to erasing light, for example, and the radiation energy remaining on the sheet 1 after the image read-out is erased. Thereafter, the sheet 1 is moved reversely in the direction as indicated by the arrow A3 onto a vertically moveable belt conveyor 3a and is conveyed thereby to the stacking section 4. The stacking section 4 shown is constructed not only to stack the sheets 1 but also to sort the sheets 1, for example by the sheet size, into a plurality of stacking trays 4a through vertical movement of the belt conveyor 3a in the direction as indicated by the arrow B.

The aforesaid radiation image read-out apparatus must be constructed compactly so that it may be installed in a small space, and the sheet conveyance system between the respective sections must be adjusted to improve the efficiency of the whole apparatus in view of the conditions at the respective sections.

However, the aforesaid conventional radiation image read-out apparatus in not suitable from the viewpoint of the required installation space or its conveyance system, and should further be improved. Also, particularly, the conveyance system between the read-out section 2 and the erasing section 3 and the conveyance system between the erasing section 3 and the stacking section 4 should be constructed so that the erasing at the erasing section 3 is easy to conduct and no problem arises with the handling of the sheets 1 stacked at the stacking section 4.

SUMMARY OF THE INVENTION

The primary object of the present invention is to provide a radiation image read-out apparatus which is small and may be installed in a small space, and in which stimulable phosphor sheets are conveyed to the erasing section so that the erasing is conducted efficiently.

Another object of the present invention is to provide a radiation image read-out apparatus wherein stimulable phosphor sheets are conveyed to the stacking section so that no problem arises with the handling of the stacked sheets, thereby improving the efficiency of the whole apparatus.

The present invention provides a radiation image read-out apparatus provided with a read-out section for reading out a radiation image stored in a stimulable phosphor sheet, an erasing section for erasing the radiation energy remaining on the stimulable phosphor sheet after the image read-out, and a stacking section for stacking the stimulable phosphor sheets after erasing, wherein said erasing section and said stacking section are positioned above said read-out section, a read-out sheet conveyance means is positioned between said read-out section and said erasing section for conveying said stimulable phosphor sheet from said read-out section to said erasing section so that the surface of said stimulable phosphor sheet facing up at said read-out section faces up also at said erasing section, and an erased sheet conveyance means is positioned between said erasing section and said stacking section for conveying and stacking said stimulable phosphor sheet so that the surface of said stimulable phosphor sheet facing up at said erasing section faces down at said stacking section.

In the radiation image read-out apparatus of the present invention, since the erasing section and the stacking section are positioned above the read-out section, the space required for installing the apparatus is decreased markedly as compared with the conventional apparatus wherein the erasing section and the stacking section are positioned at the side of the read-out section.

Also, since amount of space occupied by the read-out section is approximately equal to the total amount of space occupied by the erasing section and the stacking section, the two-tier configuration is very suitable for practice.

Further, in the radiation image read-out apparatus of the present invention, the read-out sheet conveyance means is constructed to convey the stimulable phosphor sheet so that the sheet surface facing up at the read-out section faces up also at the erasing section, and the erased sheet conveyance means is constructed to convey the sheet so that the sheet surface facing up at the erasing section faces down at the stacking section.

Accordingly, the stimulable phosphor layer facing up at the read-out section faces up also at the erasing section, and it is possible to conduct the erasing efficiently. Also, since the stimulable phosphor layer facing up at the erasing section faces down at the stacking section, there is no risk of the stimulable phosphor layer being scratched or stained when the stimulable phosphor sheet is taken out of the stacking section.

When the read-out sheet conveyance means is constructed so that the stimulable phosphor sheet is once conveyed up and then conveyed back to the erasing section and the erased sheet conveyance means is constructed so that the sheet passes above the erasing section into the stacking section as will be described later, it is possible to make the whole conveyance means compact with respect to the layout of the read-out section, erasing section and stacking section. Also, it becomes possible to simplify the mechanism and to decrease cost. The configuration is also advantageous for preventing deterioration of the sheet since the sheet is not bent so often.

DESCRIPTION OF THE PREFERRED EMBODIMENTS

The present invention will hereinbelow be described in further detail with reference to the accompanying drawings.

Figure 1:
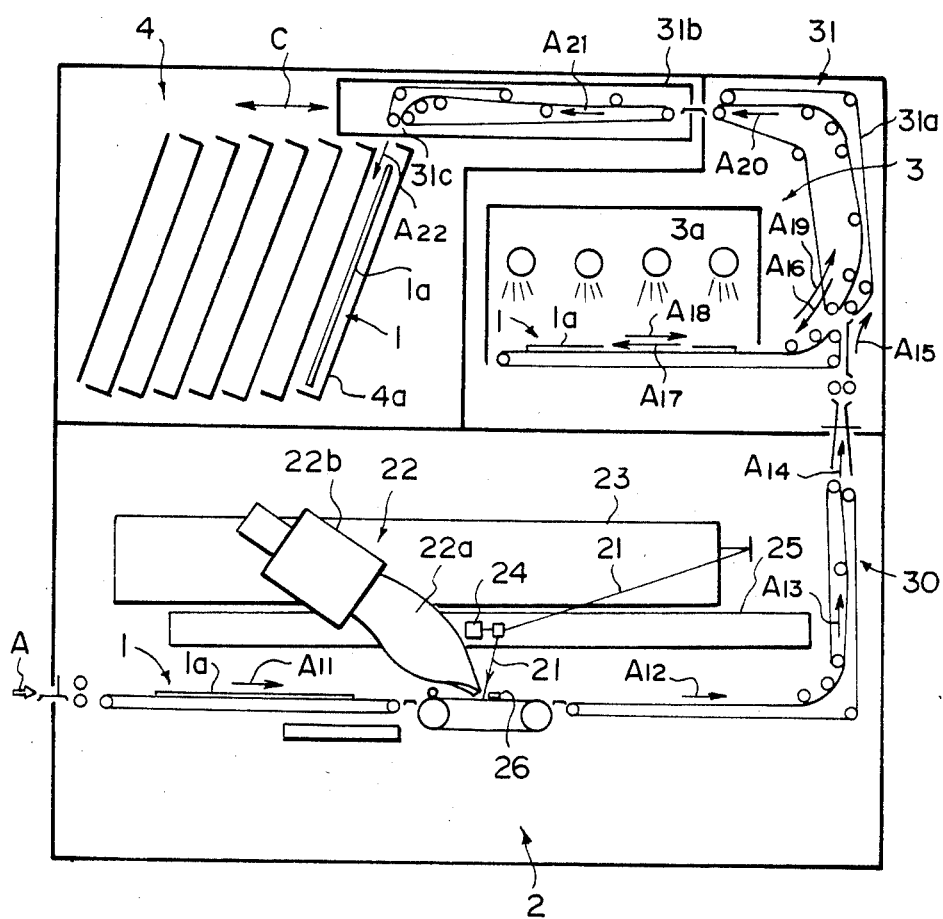
FIG. 1 is a schematic side view showing an embodiment of the radiation image read-out apparatus in accordance with the present invention.

Referring to FIG. 1, the radiation image read-out apparatus comprises a read-out section 2, and an erasing section 3 and a stacking section 4 positioned above the read-out section 2.

At the read-out section 2, a stimulable phosphor sheet 1 carrying a radiation image stored therein by exposure to a radiation passing through an object is scanned by stimulating rays 21, e.g. a laser beam, which cause the sheet 1 to emit light in proportion to the stored radiation energy. The light emitted by the sheet 1 is detected by a photoelectric read-out means 22 constituted by a photomultiplier or the like, and is converted into an electric image signal for use in reproducing a visible image. Reference numeral 23 designates a stimulating ray source, and reference numeral 24 denotes a light deflector such as a galvanometer mirror mounted on an optical plate 25. Reference numeral 26 denotes a reflection mirror for reflecting the light emitted by the sheet 1 to a light guide member 22a of the photoelectric read-out means 22. The light guide member 22a guides the light emitted by the sheet 1 through total reflection inside of the light guide member 22a to a photodetector 22b constituted by a photomultiplier or the like.

There has heretofore been known a method wherein preliminary read-out is conducted for roughly obtaining the image information stored in the stimulable phosphor sheet 1 prior to the aforesaid read-out (final read-out) for detecting the electric image signal for use in reproducing of a visible image, read-out conditions for the final read-out are adjusted based on the image information obtained by the preliminary read-out, and the final read-out is conducted by use of the read-out conditions thus adjusted.

As disclosed, for example, in U.S. Pat. No. 4,527.060, the preliminary read-out may be conducted by scanning the stimulable phosphor sheet 1 with stimulating rays having a lower stimulation energy lower than that of the stimulating rays used for the final read-out, and detecting the light emitted by the sheet 1 during the scanning by use of a photoelectric read-out means.

In the present invention, the read-out section may be constructed to conduct only the final read-out or to conduct both the preliminary read-out and the final read-out.

At the erasing section 3, radiation energy remaining on the stimulable phosphor sheet 1 after the image read-out is erased. Specifically, though most of the radiation energy stored in the sheet 1 is released when the sheet 1 is exposed to the stimulating rays 21 at the read-out section 2, a part of the radiation energy remains on the sheet 1. In order to reuse the sheet 1 for image recording, the residual radiation energy is erased at the erasing section 3. The erasing at the erasing section 3 may be conducted in any manner. In the embodiment of FIG. 1, the erasing section 3 is provided with a plurality of fluorescent lamps 3a for releasing the radiation energy remaining on the sheet 1 by exposing it to erasing light such as visible light. Alternatively, however the erasing may be conducted by exposing the sheet 1 to heat.

The stacking section 4 receives and stacks the erased sheets 1 conveyed out of the erasing section 3. The stacking section 4 may be constructed for conducting the sheet stacking only, or may be constructed as a sorter section provided with a plurality of stacking trays 4a for sorting the sheets 1 by sheet size or the like.

A read-out sheet conveyance means 30 is provided between the read-out section 2 and the erasing section 3 for conveying the stimulable phosphor sheet 1 from the read-out section 2 to the erasing section 3 so that the sheet surface is facing up at the read-out section 2 faces up also at the erasing section 3. In the embodiment shown, the conveyance means 30 comprises belt conveyors and rollers and is constructed as a switch-back means for conveying the sheet 1 in the read-out section 2 from the horizontal direction to the vertical direction in the sequence of arrows A12, A13, A14 and A15, and then conveying the sheet 1 downwardly and then horizontally in the sequence of arrows A16 and A17 to the erasing section 3.

Between the erasing section 3 and the stacking section 4 is positioned an erased sheet conveyance means 31 for conveying the erased sheet 1 from the erasing section 3 to the stacking section 4 so that the sheet surface 1a facing up at the erasing section 3 faces down at the stacking section 4. In the embodiment shown, the erased sheet conveyance means 31 comprises belt conveyors and rollers, and is constituted by a U-shaped conveyance system 31a for conveying the sheet 1 of the erasing section 3 from the horizontal direction to the vertical direction and then horizontally, in the sequence of arrows A18, A19 and A20, and a distributing conveyance system 31b for receiving the sheets 1 conveyed by the U-shaped conveyance system 31a and distributing them among the stacking trays 4a at the stacking section 4. The distributing conveyance system 31b is moveable in the direction as indicated by the arrow C for positioning its sheet outlet 31c above one of the stacking trays 4a and feeding the sheet 1 onto the stacking tray 4a. The erased sheet conveyance means is constructed to convey the sheet 1 so that the sheet surface facing up at the erasing section 3 faces down on the stacking tray 4a inclined leftwardly from top to bottom.

Figure 2:
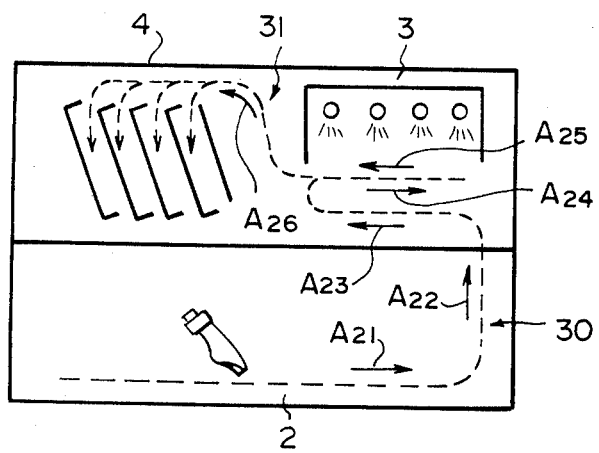
FIG. 2 is a schematic side view showing another embodiment of the radiation image read-out apparatus in accordance with the present invention.
Figure 3:
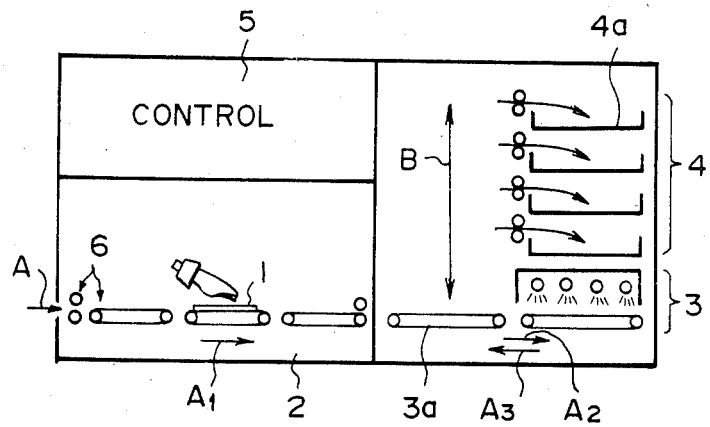
FIG. 3 is a schematic side view showing the conventional radiation image read-out apparatus.

The conveyance means 30 and 31 may be constructed in various manners. For example, as indicated by the broken line in FIG. 2, the conveyance means 30 and 31 may be constructed to convey the sheet 1 in the sequence of arrows A21, A22, A23, A24, A25 and A26. In this case, the read-out sheet conveyance means 30 is constructed in an S-shaped form, instead of as a switch-back means, and the erased sheet conveyance means 31 is not in the U-shaped form since the stacking trays 4a are inclined rightwardly.

Normally, the stimulable phosphor sheet comprises a substrate, and a stimulable phosphor layer overlaid on the substrate. At the steps of image read-out and erasing, it is necessary that the stimulable phosphor layer side of the sheet 1 be exposed to stimulating rays and the erasing light or heat. At the read-out section 2, the stimulable phosphor layer side of the sheet 1 faces up for exposure to stimulating rays. Therefore, in order to conduct erasing efficiently, it is necessary that the stimulable phosphor layer side of the sheet 1 face up for exposure to the erasing light or heat also at the erasing section 3.

Further, when the sheets 1 are stacked at the stacking section 4, for example, on the stacking trays 4a, they should preferably be stacked so that the stimulable phosphor layer side facing up at the erasing section 3 faces down. This is because, if the stimulable phosphor layer side faces up on the stacking tray 4a, there is the risk of the stimulable phosphor layer being scratched or stained by a sucking disc or the like when the sheet 1 is taken out of the stacking tray 4a by sucking the upper surface of the sheet 1 by the sucking disc or the like for reusing the sheet 1 for image recording.

We claim:

1. A radiation image read-out apparatus provided with a read-out means for reading out a radiation image stored in a stimulable phosphor sheet, an erasing means for erasing the radiation energy remaining on the stimulable phosphor sheet after the image read-out, and a stacking means for stacking the stimulable phosphor sheets after erasing, wherein said erasing means and said stacking means are positioned above said read-out means, a read-out sheet conveyance means is positioned between said read-out means and said erasing means for conveying said stimulable phosphor sheet from said read-out means to said erasing means so that the surface of said stimulable phosphor sheet facing up at said read-out means faces up also at said erasing means, and an erased sheet conveyance means is positioned between said erasing means and said stacking means for conveying and stacking said stimulable phosphor sheet so that the surface of said stimulable phosphor sheet facing up at said erasing means faces down at said stacking means.

2. An apparatus as defined in claim 1 wherein said read-out sheet conveyance means is constructed to convey said stimulable phosphor sheet once upwardly, to switch said stimulable phosphor sheet back, and then to convey said stimulable phosphor sheet to said erasing means 3. An apparatus as defined in claim 1 wherein said erased sheet conveyance means is constructed to convey said stimulable phosphor sheet above said erasing means to said stacking means.

4. An apparatus as defined in claim 1 wherein said stacking means comprises a plurality of stacking trays inclined to receive said stimulable phosphor sheet.

5. An apparatus as defined in claim 4 wherein said erased sheet conveyance means comprises a distributing conveyance system which is moveable to position its sheet outlet above one of said stacking trays for feeding said stimulable phosphor sheet onto the tray.

* * * * *